July 12, 1966  B. A. GRUBER  3,260,620
TAPE FED FUEL CELL
Filed Oct. 22, 1962  2 Sheets-Sheet 1
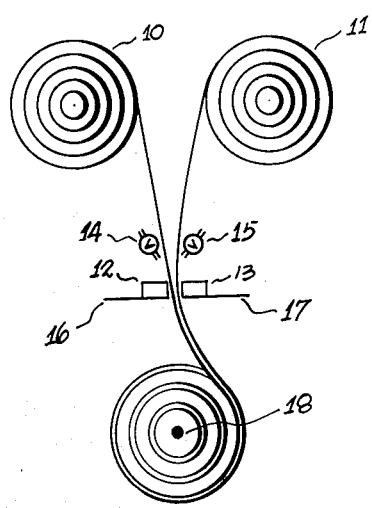
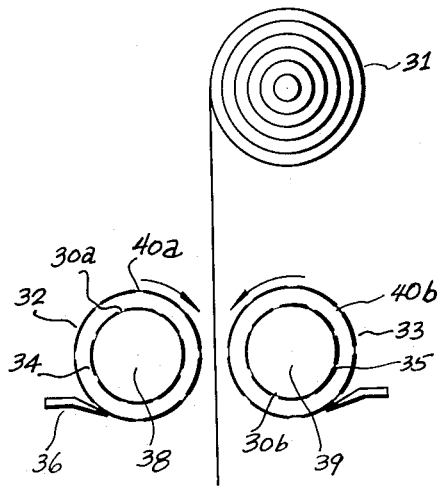
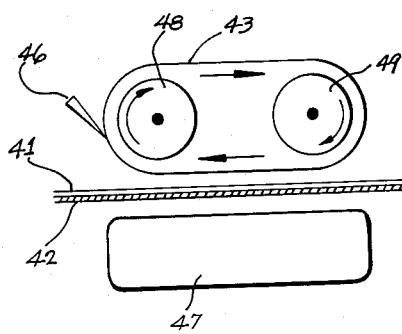
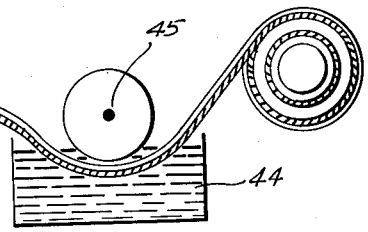
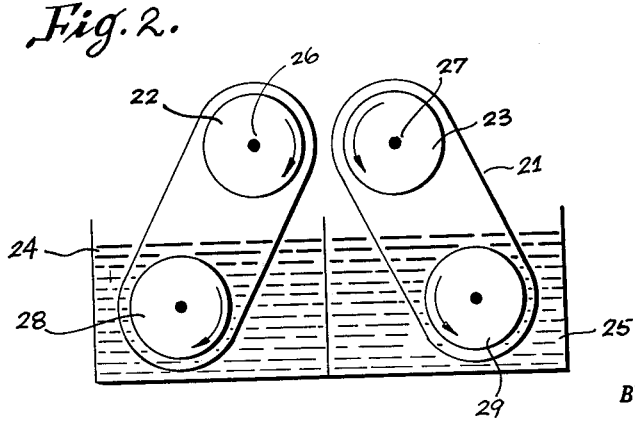
BERNARD A. GRUBER
INVENTOR.
BY Lorna A. Ferris
ATTORNEY July 12, 1966  B. A. GRUBER  3,260,620
TAPE FED FUEL CELL
Filed Oct. 22, 1962  2 Sheets-Sheet 2

BERNARD A. GRUBER
INVENTOR.

BY Lorna A. Ferris

ATTORNEY

United States Patent Office 3,260,620
Patented July 12, 1966

3,260,620
TAPE FED FUEL CELL
Bernard A. Gruber, Topsfield, Mass., assignor to Monsanto Research Corporation, St. Louis, Mo., a corporation of Delaware
Filed Oct. 22, 1962, Ser. No. 232,144
19 Claims. (Cl. 136—86)

The invention relates to fuel cells, and more particularly, provides a novel and improved fuel cell having a moving separator tape feed.

By a fuel cell is meant a device for electrochemical generation of electricity which is provided with a continuous supply of the chemicals by the reaction of which the electricity is generated, and means to remove the products of reaction. A flashlight battery lasts no longer than its self-contained supply of the electrochemical reagents. An automobile battery depends on frequent periodic charging by a mechanical generator for prolonging its life. The theory of a fuel cell is that the cell will continue to deliver electricity for so long as the reactants are supplied to the cell and reaction products removed so as to maintain a substantially invariant system.

In practice, it has been found difficult to realize this ideal. One factor presenting particularly difficulty in effective cell design is the separator between the cell electrodes. The oxidant and the fuel cell are intended to react individually at their respective electrodes. If they mix and react directly with each other, with substitution of a chemical for an electrochemical reaction, energy is dissipated without production of electrical power. Thus an effective separation between the anode and cathode compartments may be essential. However, the cell will not operate unless an internal electrolytic path is present. Ions must be able to pass between the anode and cathode compartments, and if the passage is difficult, the cell has an undesirably high internal resistance. A balance must be maintained between effectively preventing mixing of the molecular species of reactants and effectively providing for movement of the ionic species of the electrolyte.

Use of stationary ion exchange membranes as the separators in fuel cells is often not entirely satisfactory. Their life is short, where active, strong chemical reagents are used as fuel cell materials. For example, concentrated acid and alkali solutions have been shown to be desirable fuel cell materials, particularly as electrolytes. These can attack ion exchange membranes, degrading them to failure in a comparatively short time.

Another item causing difficulty in fuel cell operation is polarization of the electrodes. This is a phenomenon which may be described as departure from thermodynamic ideality. It reduces the difference in potential between the two electrodes when current is flowing, reducing the amount of power the cell can generate. Thus the open circuit voltage of a cell may be high, but the drop in this potential difference when a load is applied by connection to an external circuit immediately reduces the voltage developed. Further polarization is observed as the cell is operated. The polarization increases as the current drain increases, so that at high loads, a cell may very quickly become too far polarized to deliver any substantial amount of power.

Still another difficulty sometimes of concern in fuel cell technology is design of conveniently transportable units. Gases, such as used in the hydrogen/oxygen cell, require heavy, bulky equipment for their transport and storage. Liquids are more convenient to use, but also can present problems. The possibility of spillage must be considered in design of portable cells. Gravity feed cannot be depended on when the cell may be tipped while being operated, or in environments where the cell must operate independently of gravity, in space capsules or the like.

It is an object of this invention to provide an improved method of operation of a fuel cell.

A particular object of this invention is to provide a novel fuel cell construction capable of prolonged operation.

These and still other objects will become apparent from the following description, considered in conjunction with the drawings in which:

FIGURE 1 is a diagrammatic vertical section of an embodiment of a fuel cell employing a moving tape separator in accordance with the invention;

FIGURE 2 is a diagrammatic vertical section of another embodiment of a fuel cell in accordance with the invention, employing belts as moving tape separators;

FIGURE 3 is a diagrammatic vertical section of still another embodiment of a fuel cell in accordance with the invention including means for feeding the electrode sites internally;

FIGURE 4 is a diagrammatic vertical section of still another embodiment of the moving tape separator fuel cell;

Figure 5:
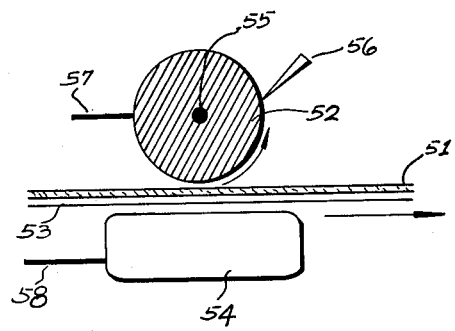
FIGURE 5 is a diagrammatic vertical section of a further embodiment of the moving tape separator fuel cell.

In its broadest embodiment, this invention provides a fuel cell in which the electrolytic connection between the current collectors is made through a separator which moves past the active electrode sites.

In a preferred embodiment, the invention provides a fuel cell in which the electrolytic connection between the current collectors is made through a separator which moves past the active electrode sites and which separator acts as a carrier for at least one of the fuel cell electrochemical reaction components.

In a still more preferred embodiment of the invention, there is provided a fuel cell in which the electrolytic connection between current collectors is made through a separator which moves past the active electrode sites and which is a dry tape carrier of a fuel cell electrochemical reaction component.

Also provided by this invention are fuel cell dry tape separators adapted to be employed in fuel cells as a carrier of at least one of the electrochemical reaction components.

What is meant herein by the active electrode site is the site of the introduction or withdrawal of electrons to or from the electrolyte. The term electrode is sometimes given this restrictive meaning, but is generally used to designate, broadly, a device for the accomplishment of this result. Most of the electrode, in this broader sense of the term, is a current collector, with the function of conducting electrons to or from the site of their exchange with the electrolyte.

In the fuel cells employing moving separators as provided hereby, as will become evident hereinafter, the functions of current collector and producing exchange of electrons with the electrolyte may require distinction, in some cases. For the purposes of discussion, the portion of the electrode actively participating in the electron/electrolyte exchange may be identified as the active electrode, and the remainder of the conductive material, as passive electrode. The active electrode material may actually be carried to the site of the electrochemical reaction by the separator, as will be seen from the following discussion, whereby it becomes the active electrode when the separator contacts the current collectors and provides the electrolytic path therebetween. These and other embodiments of the invention are further described in detail hereinafter.

Fuel cells are inherently dynamic systems, which necessarily provide for the inflow and outgo of reactants and products. Yet designs for them have ordinarily taken the static approach of the closed systems of conventional LeClanché cells and the like. The electrode separator of a fuel cell is a part which has conventionally been designed for static operation. By provision of a separator which moves past the active electrode sites in a fuel cell as provided hereby, it is found that a variety of considerable advantages can be gained.

On the one hand, this tape may be arranged so that after passage between electrodes, it exits from the electrochemical zone to be treated as cell operational waste. In this case, an advantage of the arrangement of the invention will be that the tape separator between the fuel cell electrodes can be made of inexpensive porous material, which will permit ion transfer while preventing direct mixing of the fuel and oxidant reactants. Porous separators with pores of sufficient size to permit physical transport of chemical molecules eventually permit the reactants to diffuse through and mix. But if the porous separator is continually moved away from the electrode zone to which the reactants are fed, before the reactants have travelled completely through the separator, then this mixing of the reactants is prevented.

Moreover, this invention can advantageously be applied in a fuel cell including highly reactive materials, such as a cell using nitric acid, as an oxidant-electrolyte. By employing a disposable separator, so that before attack of the fuel cell reactant on the separator has proceeded far enough for the separator to fail, the portion of the separator exposed to this reactant has been moved away and out of the cell, the problem of separator failure is alleviated.

When the separator is made of an ion exchange material, such that molecular transport through the film is not possible, if desired, an arrangement may be made to cycle the tape within the cell, rather than discard a portion. Advantages can still be gained by using a mobile separator in design of the cell.

As discussed above, a significant factor in preventing optimum performance of fuel cells is polarization of the electrodes. The polarization can be shown to be made up of several different components, one of which is concentration polarization. Concentration polarization produces mass transfer limitations on the performance of the electrodes. A finite amount of time is required for the reactants to reach active sites at the electrode where they can undergo the electrochemical reaction (oxidation or reduction) and to be removed from such active sites, leaving the sites available for further reactant to occupy them.

In the first place, the movement of the separator to and away from the electrodes can assist in conducting this process of reactant transfer. The process of diffusion is supplemented by a physical transporting action. The tape can pick up intermediate or ultimate reaction products and assist in conveying them away from the electrode, as it cycles in the cell.

Even more effectively, the electrodes can be arranged to rotate while the moving separator runs between them. Thus for example the friction of the separator moving between the electrodes, set under proper tension, can cause appropriately mounted electrodes to rotate so that the point at which the electrodes contact each other is continually changing. This means that the active portion of the electrode is continually being moved away from the electrochemical reaction site, and allowed to rest (depolarize) until the rotating movement has carried it back to the electrochemical site. It is known that polarization decreases and eventually disappears when an electrode is out of operation. In accordance with the present invention, with the active portion of rotating electrodes continually changing, the remainder of the electrode is continually being held out of operation, thus alleviating polarization.

The tape will advantageously serve as a carrier for one or more of the fuel cell components. For example, while the electrode separator must prevent the direct mixing of the fuel being supplied to the anode and the oxidant being supplied to the cathode in a fuel cell, to provide the necessary electrical connection between the two electrodes, an electrolytically conductive medium must permeate the separator. To accomplish this, the moving tape separator may be routed through a bath of electrolyte during its travel path to the electrode sites at which the fuel and oxidant are supplied. Then as the fuel contacts the anode in the presence of the electrolyte on one side of the separator, and the oxidant contacts the cathode in the presence of the electrolyte on the opposite side of the separator, they can each undergo their respective electrochemical reactions while the electrolyte-impregnated separator provides the conductive path between the electrodes.

Various electrochemical systems have been devised in which a single liquid can serve the function of fuel and electrolyte, and another single liquid can serve the function of oxidant and electrolyte. For example, the fuel-electrolyte solution may be an aqueous solution of methanol as the fuel and potassium hydroxide as the electrolyte. The oxidant-electrolyte liquid feed may be an aqueous solution of hydrogen peroxide. Where the anode and the cathode feeds are each liquids, a double tape system may be used. One tape may be run through the solution of fuel and electrolyte. The other tape may be run through the oxidant-electrolyte solution. The tapes may then be routed to come together in a face to face relationship at the point of entry into the space between the electrodes, where the electrochemical reactions at the anode and cathode take place.

Using the tape as a carrier of electrochemical reaction components may be combined with gaining the above discussed advantages of a moving tape separator arrangement. Thus, use may be made of reactants which attack usual membrane separators on standing when a permanent, stationary membrane is employed. A rotating electrode system may be set up, whereby the segments of the electrode, after acting as the electrochemical reaction site, are rotated away from this site and allowed to rest so that polarization falls off before this electrode position is rotated back to participate in the electrochemical reaction.

Moreover, sometimes further particular advantages can be gained by employing the tape separator as a carrier of the electrochemical reaction components. Thus, it is sometimes desirable to use an electrolyte which is chemically corrosive to the electrode material. An example of this is the fuel cell system employing magnesium as a consumable anode material. Ammonium bromide has certain advantages over magnesium bromide as the electrolyte solute in such systems, but the magnesium salt is the material of choice nevertheless, because ammonium bromide is chemically corrosive to the metal. The corrosion losses during the electrochemical reaction are not important, but the losses of the metal due to the corrosion reaction during storage of it in contact with the ammonium electrolyte are too high to be tolerated. Now if the electrolyte solution is conveyed to the electrode only during the period that the cell is being required to deliver energy, the more active ammonium bromide electrolyte can be tolerated, and thus substituted for the magnesium bromide electrolyte.

The losses of electrode metal due to chemical corrosion can, if desired, be still further minimized by employing an arrangement wherein the tape is a carrier of the active electrode material. Thus for example, a tape may be coated with magnesium, which is carried by the tape to the current collectors where the tape coating acts as the active electrode. When the cell is to be used to generate current, the tape will go through a path in which it is wet by an ammonium bromide electrolyte, from which it will proceed to complete the electrical circuit between the current collectors, then acting as the active electrode. When the cell is out of operation, the magnesium will not be in contact with the chemically corrosive ammonium bromide solution, and thereby corrosion losses are obviated.

Still another carrier aspect of the tape separator of this invention can be action in the removal of waste products from the cell. For example, the above-discussed magnesium electrode operates by discharging magnesium ion into a neutral or alkaline aqueous electrolyte solution, where the magnesium picks up hydroxide ions to form a precipitate of magnesium hydroxide. When no provision is made for the removal of this material, accumulation of the precipitate may choke the cell. To the extent that byproducts and waste products are continually drawn from the fuel cell operating chamber as they are generated, improvements in fuel cell operations can be obtained. This removal can be effected by the frictional action of the movement of the tape itself. It may also be accomplished by this movement in conjunction with other arrangements as discussed above: for example, use of rotating electrodes, which can be combined if desired with a doctor blade scraping the electrodes as they rotate.

Dry tape carriers of fuel cell reactants offer still further advantages. In this embodiment of the present invention, the tape separator carries one or more components of the fuel cell to the electrochemical reaction site in the form of a coating on the tape. The presence of free liquid in the cell can be completely eliminated, to achieve the advantages of a dry cell, which operates independently of gravity or of the position of the cell.

Thus, fluid materials can be applied to the tape separator as a coating of rupturable capsules. These may, for example, be what may be termed macrocapsules. If two tapes are sealed together around the periphery of defined areas, the space between can be a liquid trap. For example, the two tapes can be sealed down the sides and sealed across in stripes at intervals down their lengths. The open spaces between the sealed parts can then serve as liquid containers. The tape can be cycled past sharp points or the like which rupture the capsules before they get to the electrodes. Two such tapes, or a coating on either side of one tape, can supply the anode and the cathode feeds respectively.

Conveniently, in a more sophisticated system, the electrochemical reaction components can be coated on the tape in the form of pressure-rupturable microcapsules. Encapsulation techniques produce minute droplets of liquid encased in a coating of film-forming materials such as copolymers, which can be applied to a substrate such as paper to produce an adherent coating thereon. Thus fluid fuel-electrolyte and oxidant-electrolyte systems can be encapsulated and applied to opposite sides of a porous tape separator. Passage of the tape between closely spaced electrodes can exert sufficient pressure on it to rupture the capsules and thus release the reactants, as well as electrolyte.

Not only may be the electrolyte, fuel and oxidant components of a fuel cell system be supplied to the electrodes by a moving tape system, but indeed, what may be regarded as the electrode itself may be provided by the tape.

Magnesium consumable anodes are mentioned above. A magnesium coating may readily be applied to one side of a separator tape, producing a laminated tape on which the magnesium is supplied as fuel to the electrochemical site. The other side of the tape may also be provided with a dry coating of oxidant-electrolyte solution enclosed in rupturable capsules, as discussed above, or if desired, the tape may be cycled to be wet by such a solution as a free liquid before the tape proceeds to the electrochemical reaction site.

When a laminate of the stated nature is used, the device at the anode site in the cell need be no more than a current collector. For example, it can be simply an electrically conductive contact, made of carbon, copper or the like, able to pick up and conduct away the electrons as they are released by solution of the metal in the electrolyte.

Similarly, a cathodic current collector, made of conductive materials as described such as carbon, may be used in conjunction with a tape carrying an active cathode material such as silver (II) oxide, wet for example with aqueous KOH as electrolyte, and if desired, laminated to a coating of zinc on the reverse side, to act as an active anodic material, whereby the device at the cathode site may also be merely a current collector as above described.

The tape carrier approach is not limited to consumable electrodes, either. While cathode and anode materials such as carbon and noble metals may be referred to as "inert," the nature of the electrode is recognized to have a definite, pronounced effect on the facility with which electrochemical reactions proceed. Factors involved in this may include catalytic activity of the electrode material in promoting the electrochemical reaction, effect of porosity in providing reaction sites and so forth. One of the factors involved in polarization of electrodes (decline in potential developed by the cell) seems to be an effect of saturation of active sites.

Active electrode materials such as platinum can be applied to tapes in very thin coatings by methods such as sputtering. The tape can thus carry a continuously fresh electrode surface to the electrochemical reaction site. As a result, the limits on the rate at which an electrode can deliver current by lack of sufficiently rapidly available reaction sites can be avoided. Again, here, the device at the reaction site can be merely a current collector, with the tape carrying the active electrode surface to it.

Indeed, as will be readily evident from the foregoing, the moving separator tape can advantageously carry every active component of the fuel cell, including fuel, oxidant, electrolyte fluid and on top of this, the active electrode surfaces (including catalysts), all in one package.

Referring now in further detail to the embodiments of the invention illustrated in the drawings, FIGURE 1 represents a fuel cell with a moving electrode separator tape in accordance with this invention, in diagrammatic vertical section. 10 and 11 are rolls of separator tapes, following a path past electrode feed source valve outlets 14 and 15, between electrodes 12 and 13 provided respectively with leads 16 and 17, to wind up together in a roll on spindle 18. Assuming for the purposes of discussion that electrode 12 is the anode, which may be a graphite bar, as in an experimental embodiment of this cell described hereinafter, for example, then valve 14 leads to a source of fuel and anolyte, such as a solution of 5 molar hydrazine in 1 molar aqueous KOH, fed to wet the tape 10 through valved outlet 14 (from a source not shown). Electrode 13 is the cathode, which is a graphite bar, for example, wet by way of tape 11 through valved outlet 15 by a source of oxidant/catholyte such as aqueous 5 molar hydrogen peroxide (from a reservoir not shown). For purposes of illustration, the electrodes and tapes are shown as separated by gaps; actually they will be pressed together in intimate contact, to minimize internal resistance.

In an experimental embodiment of a fuel cell constructed in accordance with FIGURE 1, the solutions of hydrazine and hydrogen peroxide described above were employed to wet the exterior faces of the tapes, which were rolls of paper. Provision was made to wet the contacting faces of the paper rolls with 1 molar sodium hydroxide, above the point that the two rolls of paper were pressed in face to face relationship between the electrodes, which were of graphite. The electrodes were connected to an external circuit, and the tapes drawn between the electrodes while the voltage developed at a given current drain was measured. At a current drain of 20 milliamperes, the cell voltage was 0.03 volt and at a current drain of 5 milliamperes, the cell voltage was 0.3 volt.

The cell of FIGURE 1 can be readily visualized as embodied in a light soldier's back-pack, for example. To start the cell, valves 14 and 15 are opened, and the tapes 10 and 11 are caused to move past electrodes 12 and 13, for example by winding a keywound spring drive (not shown) mounted on spindle 20. Leads 16 and 17 are connected to an external circuit, and work is done by the electrical power generated. The key winding of spindle 20 can be replaced by means such as manually pulling out waste tape separator from between the electrodes, if desired. The cross-section diagrammed in FIGURE 1 can be that of wide continuous tapes, passing over long continuous electrodes, or both can be sectional, with the electrodes connected in series or in parallel. The fuel cell designs in which rows of electrodes are stacked in packs of flat plates, with opposing faces the anode and cathode, can also readily be adapted to form a battery of cells like that of FIGURE 1, and the tape can run through the cells in a single plane, or wind in and out around multiple electrodes. Other modifications can be made also: for example, instead of two tapes as illustrated, a single tape can be wet on one side with the anolyte feed and on the other side with the catholyte feed. The valved feed outlets can be eliminated in cells using a tape carrying a dry coating of encapsulated feed, and so forth.

FIGURE 2 illustrates an embodiment of the invention using cycling tape belts, in diagrammatic vertical section. In this embodiment, the moving tape separators 20 and 21 are endless belts of an ion exchange, semipermeable membrane such as cellophane, passing around anode 22 and cathode 23, and around feed roller 28 and feed roller 29 respectively. Anode 22 and cathode 23 are also roller-shaped, and are carbon rods, the anode being suitably surfaced with electrolytically active material such as platinum. Shaft 26 is the axis of the anode 22 and shaft 27 is the axis of the cathode 23, and shafts 26 and 27 act as leads for connection of the cell to an external circuit (not shown). The electrodes 22 and 23 are rotatably mounted on the shafts 26 and 27 passing through their axes. Means (not shown) are provided for rotating one or both of feed rollers 28 and 29 on their axes, such as key wound springs on the ends of shafts running through their axes. If only one feed roller is driven rotatably, the other is mounted rotatably on its shaft, and friction of the tapes transmits the drive to it, so that it also rotates. The rotating drive causes belts 20 and 21 to cycle around roller electrode 22 and feed roller 28 and around roller electrode 23 and feed roller 29 respectively. Feed roller 28 is immersed in a bath 24 of a solution of a soluble fuel such as hydrazine and an electrolyte such as potassium hydroxide, in aqueous solution. Feed roller 29 is immersed in a solution 25 of a soluble oxidant such as a solution of hydrogen peroxide in 14 molar sulfuric acid. Thus as the tape belts 20 and 21 are rotated into the respective fuel solution 24 and oxidant solution 25, they pick up these fuel cell reactants and carry them to the electrodes. The electrochemically active portion of the electrodes is the point on the circumference which is in electrochemical contact through the separators with the other electrode. Rotation of the electrodes causes this active electrode site to change continuously, whereby the electrode sites which have become polarize while acting as the active electrode are enabled to become depolarized before rotation back to the active electrode site. The moving tape belts 20 and 21, which can advantageously be one-sided Moebius strips, present a continuously changing surface to the electrode face, and continuously feed fresh reactant to the electrodes while driving them.

FIGURE 3 is a diagrammatic vertical section of a fuel cell construction in accordance with the invention, with another rotating electrode construction. Here moving separator tape 31, made of paper for example, passes between concentric hollow tubes 32 and 34 and concentric hollow tubes 33 and 35. The exterior concentric tubes 32 and 33 are electrodes, and made of suitable electrode material such as platinized carbon and carbon respectively. Tube 32 is positioned as a slip ring on tube 34, and tube 33 as a slip ring on tube 35. Interior tubes 34 and 35, which may be steel pipes, for example, are each fixed in position, and the hollow interiors 38 and 39 of these tubes are connected respectively to reservoirs (not shown) of anode feed supply such as aqueous methanol in KOH and cathode feed supply such as hydrogen peroxide or gases, such as hydrogen and fluorine. Tubes 34 and 35 are each penetrated by perforations 30a and 30b, so their feed supply can exit to contact the surrounding slip ring tubes 32 and 33, and tubes 32 and 33 are each provided with means for exit of liquids or gases through their circumferences, such as pores or perforations 40a and 40b. Tape 31 is in frictional contact with tubes 32 and 33. Brush current collectors and leads 36 and 37 provide external circuit connections. To operate this cell, leads 36 and 37 are connected to an external circuit, anode feed is supplied in the hollow interior 38 of tube 34 and cathode feed in the interior 39 of tube 35, and the tape 31 is drawn, by means such as manual pulling, down between electrode tubes 32 and 33. The frictional relation of the tape 31 to the tubes 32 and 33 causes them to rotate on interior tubes 34 and 35. The active electrode site on electrode tubes 32 and 33 then continually changes. The sites becoming polarized by participation in the electrochemical reaction at the contact point of tape 31 with tubes 32 and 33 are thus rotated away and have an opportunity to become depolarized before returning to the active electrode site.

In still another embodiment of the invention, shown in vertical diagrammatic section in FIGURE 4, the cathode is a copper band 43 rotatably mounted on rollers 48 and 49, which, when it touches the tape separator 41, is contacted by an electrolyte solution in which copper oxide is reduced to metallic copper, such as aqueous ammonium bromide. As the rotating action of the electrode brings the point of contact away from the tape, if any residual electrolyte is left on the surface, it is wiped away, as for example, by a brush 46. The freshly reduced copper surface now comes into contact with air, which will oxidize it again to copper oxide. When the copper oxide is being reduced to copper by contact with the electrolyte, it will withdraw electrons from the electrolyte solution, and act as the cathode. This embodiment of the invention accordingly employs oxygen of the air as the cathode feed. The anode feed may be any desired material such as, for example, a sputtered coating of magnesium 42 on the other side of the tape 41. By passing the tape into contact with aqueous ammonium bromide solution, for example, by feeding it under a roller 45 in a bath 44 of the stated solution, only just before the tape 41 brushes against the rotating copper cathode 43, the magnesium is caused to go into solution in the ammonium bromide electrolyte and accordingly give up electrons to the current collector 47 contacting the tape at the opposite face from that contacting the rotating copper electrode. Thus the point where this current collector 47 contacts the magnesium tape coating 42 will be the active anode site, and connection of the current collector 47 and the rotating copper tube 43 into an external circuit (not shown) while the tape is fed between them generates power.

FIGURE 4 also illustrates means which may be employed in accordance with the invention for minimizing current density at the active electrode site, employing an electrode rotating so that continually changing sites on the electrode participate in the electrochemical reaction while the remainder of the electrode device is enabled to depolarize. If the electrodes are rollers, and electrical contact where they touch is limited to a line contact, the consequences may be an unduly high current density at the active electrode site and lack of opportunity for the reactants to be fully consumed before being conveyed away from the electrochemical reaction site. The embodiment of FIGURE 4 provides elongated surfaces for current collector 47 and for the copper band 43, which are in electrolytic contact through the electrolyte-wetted tape base 41 and the layer of magnesium 42 on the tape base. This provides an enlarged surface area for the electrode sites with lowered current density as compared to line contact of a roller electrode, and a chance for all the copper oxide on the band and magnesium on the tape to be consumed before the tape exits from between the band 43 and the current collector 47. The stated results, of lowering current density over the active electrode surface and providing a prolonged active electrode site for completion of the electrochemical consumption of reactants, can also if desired be achieved by other means which will be readily apparent to those skilled in the art: for example, flat plate current collectors can be provided, in an embodiment such as that illustrated in FIGURE 3, which press against the two opposite faces of the tape after it exists from between the rollers and act as current collectors over the path during which the tape carries residual reactant capable of undergoing the electrochemical reaction.

FIGURE 5 illustrates still another embodiment of the invention, in diagrammatic vertical section. Here a tape base 51, wet with electrolyte such as aqueous ammonium bromide, passes under a magnesium roller 52 which presses the tape reverse side carrying a coating of m-dinitrobenzene 53 against a current collector 54. The magnesium roller 52 is mounted on a shaft 55 on which is rotates, whereby the point on the magnesium surface which is the active electrode site continually changes as the tape separator 51 moves past the roller 52. The part of the roller 52 touching the moving tape 51 is the active electrode site; the rest of the roller is passive anode. A doctor blade 56 scrapes magnesium hydroxide off the roller surface as it rotates past it, keeping the surface clean. When the current collector 54 and magnesium roller 52 are connected by conductors 57 and 58 to an external circuit (not shown), and the tape moved between them, power is generated.

Figure 6:
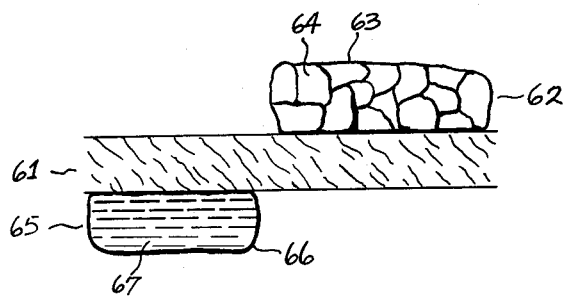
FIGURE 6 is a diagrammatic horizontal section of a tape separator construction provided in accordance with the invention.

FIGURE 6 is a horizontal diagrammatic section view of a tape which may be employed in accordance with the invention for a dry tape feed. In this tape, 61 is the base, permeable to electrolyte, made of a bibulous material such as paper or the like. Adhered to the base 61 is a closed cell foam 62. In this foam 62, cells are defined by walls 63, which completely enclose interior spaces 64 which are filled with an electrochemically active gas such as fluorine. The closed cell foamed polymeric coating on the tape may be formed for example, by blowing fluorine into an inert polymer such as polyethylene, at a temperature sufficient to soften it, and then cooling to harden. The layer 65 on the other side of the tape base 61 is a series of rupturable capsules enclosed by walls 66 made of solid polymeric material such as polyethylene, for example, enclosing fluid electrolyte 67. Portions 68 of the tape base 61 are left uncoated, which will be available to access of the contents of layers 62 and 65 upon their rupture.

Figure 7:
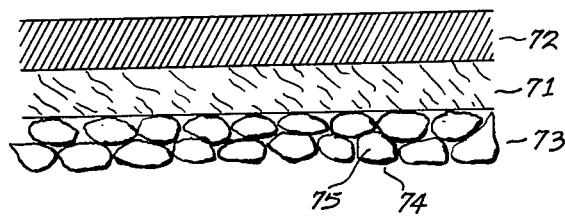
FIGURE 7 is a diagrammatic vertical section of another embodiment of a dry tape separator for a fuel cell in accordance with the invention.

FIGURE 7 shows a vertical diagrammatic section view of another such tape, in which 71 is a bibulous base material such as paper coated with a consumable anode material such as a sputtered magnesium coating 72. A layer of capsules 73 is adhered to the opposite surface of the tape. The outer capsule surface 74 may be made of a flexible, rupturable material such as polyvinyl chloride. The space 75 inside the capsules contains a fluid oxidant-electrolyte solution such as an aqueous suspension of di-nitrobenzene. Puncturing or crushing the frangible capsules releases the oxidant-electrolyte solution to wet the surface of the paper tape 71.

Materials which can be used as the tape separator materials include as a preferred class cellulosic materials, and still more preferably, matted or felted sheets of cellulosic fiber such as paper. Papers produced from pulps made by mechanical pulping or by chemical methods or by a combination of the two can be employed, and it may be bleached or unbleached. The sulfite pulp papers made from wood and waste paper are representative of such materials, the cellulosic materials in the resulting papers generally consisting primarily of α-cellulose. A variety of other cellulose materials and derivatives may also be employed as the tape base. For example, cellulose esters such as cellulose acetate, cellulose acetate propionate and cellulose acetate butyrate, and cellulose ethers such as ethyl cellulose can be formed into films useful as the tape base. The tapes may also be made of semipermeable, substantially homogeneous organic sheet material comprising regenerated cellulose. For example, this may be cellophane, which is a regenerated cellulose formed by coagulating an aqueous solution of sodium hydroxide and viscose (aged cellulose xanthate), in a bath of sodium acid sulfate. Cellulose can also be regenerated from cellulose acetate by saponification to provide materials which are highly wettable as well as resistant to chemical attach. The tape base may also comprise hydrophilic cellulosic derivatives such as methyl cellulose, carboxymethyl cellulose, hydroxyethyl cellulose, and the like, particularly as coatings or impregnants, for example, of alpha cellulose fibers.

It may sometimes be advantageous to employ, as a substrate, various other materials in the preparation of the base of the tape. The tape base may thus, if desired, comprise felts of fibers resistant to heat and to chemicals such as silicon carbide and asbestos, glass or the like. Woven constructions, comprising cloth such as woven cotton, rayon, wool, and synthetic fibers such as the acrylic polymer fibers can also be used.

The tape base can also comprise an ion exchange membrane, comprising as the active species a synthetic resin provided with functional groups, which are acid groups for cationic permeability and hydroxy groups for anionic permeability. The resin employed to form the ion exchange resin will generally be a cross-linked material such as a styrene polymer cross-linked with divinyl benzene or a formaldehyde-phenol condensate. To introduce acid groups on such resins, the resin may, for example, be sulfonated with a reagent such as chlorosulfonic acid. Quaternary ammonium hydroxide groups are useful anion exchange sites. These may be produced on a hydrocarbon base, for example, by chloromethylation, followed by amination with trimethyl amine to form the quaternary. Treatment with aqueous base such as aqueous potassium hydroxide introduces the alkaline groups. The powdered ion exchange resins can be molded into membranes by mixing the resin with a thermoplastic polymer product such as polyethylene or polyvinyl chloride as a binder in a ratio, for example, such as two parts of resin to one part of binder. The molded membrane may, if desired, be soaked in water, aqueous acid such as 3 N sulfuric acid or aqueous base such as aqueous KOH, to promote its activity, prior to use.

In references to a tape herein, what is meant is a structure having two dimensions which are very large in relation to the third dimension, such as a sheet, the width and length of which are very much greater than the thickness. The width of the tape, furthermore, is usually desirably small in relation to its length.

Coatings may be provided on the web forming the base of the separator base. These coatings may comprise, for example, materials which promote rapid wetting of the base by aqueous electrolyte solutions. For example, they may comprise the hydrophilic cellulose derivatives mentioned above, such as carboxymethyl cellulose, hydroxyethyl cellulose, and the like. The inclusion of surface active agents may be advantageous. Thus for example, the tape may carry a coating including an anionic surface active agent such as an alkyl aryl sulfonate like dodecylbenzenesulfonate sodium salt, or a sulfated alcohol such as the lauryl sodium sulfate. Alternatively a quarternary ammonium salt such as cetyl triethyl ammonium chloride, or a nonionic surface active agent such as the sorbitol anhydride fatty acid ester or polyoxyethylene derivatives of this anhydride, of diisobutylphenol, of long chain amines, of fatty amides, and the like may be included. Synthetic resins of the urea-formaldehyde and melamine-formaldehyde type are desirably present in paper compositions to promote wet strength without appreciable sacrifice in absorbency. In general a size-free paper is desirable, to maximize absorbency. Fillers such as clay, chalk, or other metallic oxides or salts may or may not be present.

Coatings carried by the tape base may further advantageously include one or more fuel cell reaction components.

The weight of reactants applied per area of tape surface will vary depending on the intended current drain. Surprisingly small amounts are needed. For example, using a one-inch width tape, five amperes can be generated with a tape draw rate of 1 inch per minute by a layer of magnesium only .0024 centimeter thick. With the same rate of draw and current drain, the weight of hydrazine consumed will be only .0249 gram per inch; the weight of nitric acid consumed will be only .0391 gram per inch, and so forth.

Metallic coatings may be applied to the base by a variety of methods, to provide a consumable anode material. A base may be sputter-coated with a metal like magnesium or zinc, or it may be laminated to a metal foil such as aluminum foil, using hide glue, ethyl cellulose, or like adhesives. Metallic coatings on the tape may also comprise catalytically active electrode materials such as platinum, palladium, or the like, applied by means such as those above mentioned.

Coatings on the tape may also comprise dry solid electrochemical reaction components, other than the consumable anode metals, such as powdered fuels, oxidants and electrolytes which are solid at room temperature. Exemplary of such electrolytes are, for example, sodium hydroxide, potassium hydroxide, ammonium bromide, magnesium bromide, sodium sulfate, and the like. Illustrative of the dry solid fuels are organic materials such as urea, glucose, and the like. There are a large number of oxidant materials which are available as dry solids at room temperature, exemplary of which are solid inorganic oxidants such as sodium peroxide, manganese dioxide, vanadium pentoxide, sodium chromate, sodium perborate, lithium perchlorate, potassium persulfate, sodium permanganate, and the like, and dry solid organic oxidants such as m-dinitrobenzene and so forth. Application of such dry powders to a tape base can conveniently be effected by means conventional in the art for coating paper, such as mixing the dry solid with an adhesive solution and applying it to the paper base surface. The adhesive employed, for example, may conveniently be a starch solution, (prepared by solubilizing the starch with an acid, heat or enzyme treatment), optionally mixed with a humectant such as glycerine.

Liquid or gaseous fuel cell reaction components carried by the dry tape will be enclosed in cell walls, with the cell walls being formed of polymeric material. Methods of adhering polymeric materials to bases such as paper tapes are readily available. For example, adhesives may be used or the polymeric material may be contacted with the paper while it is fluidized by being heated above its melting point or wet with a solvent or fluid swelling agent. Polymers which may be used to form the walls of the cells enclosing the fluid carried by the tape may comprise, for example, flexible thermoplastics such as polyvinyl chloride, polyethylene, polymers of tetrafluoro- and chlorotrifluoroethylene, polyvinyl acetate, and so forth, or a film-forming polymeric material of natural origin which is a hydrophilic colloid such as gum arabic, gelatin or the like. Means employed to produce enclosure of fluids in a closed cell plastic wall can be, for example, forming a tube of the polymeric material, into the hollow center of which the fluid is loaded; bubbling gas into or dispersing a liquid into a fluid melt of the polymer, or the like. Microcapsules of liquid are conveniently produced by suspending the liquid in a fluid medium with which it is immiscible, and in which a film forming material is dissolved. Thus for example, dinitrobenzene may be dispersed in water containing dissolved hydrophilic colloids such as gum arabic and gelatin. The immiscible liquid is agitated in the fluid medium to form tiny droplets coated by the fluid medium, and then the film-forming material is caused to solidify, producing enclosure of the liquid in walls of the solidified, film-forming polymer. Colloids such as gum arabic and gelatin are coacervated by means such as changing the temperature or pH of the medium. The resulting suspension of encapsulated liquid can then be coated onto a surface such as paper, to which it will adhere on drying, forming a coating of pressure-rupturable, fluid-containing capsules.

Polymeric coatings may also be provided on solid reactants adhered to the tape surface, using for example a water soluble polymer like polyvinyl alcohol to adhere a powder to the tape surface, providing it also with a protective coating removable by exposure to aqueous media at the time of use.

The coatings comprising fuel cell reaction components will be suitably applied to the tape so that in use, the tape base will be wetted by an aqueous solution of electrolyte, fuel will be provided on one face of the base at the anode and in contact with the electrolyte solution, and oxidant will be provided on the opposite face, contacting the cathode, and in contact with the electrolyte solution. Thus for example, the tape may be provided with a plurality of coatings, such as a face of magnesium on a paper base coated on the opposite face with a first layer of dry ammonium bromide and a second layer upon this of microcapsules comprising dinitrobenzene and water, disposed so that pressure ruptures the capsules permitting the solution to wet the ammonium bromide, which then soaks into the paper base to provide an aqueous solution of ammonium bromide wetting the magnesium face. Separate layers, however, will often not be essential: for example, the electrolyte and fuel may be mixed in a single layer, usually, and so forth.

The fuel cells in which the separator tapes of the invention are employed may comprise any suitable current collectors as the material leading to the point where the electrodes are placed in electrical contact through the tape separator. Where the current collectors comprise the electrodes, they are desirably not only conductive material but also adsorb the reactants employed, and act as catalyst for the electrode reactions. Suitable current collector and electrode materials include conductive carbon and copper, noble metals such as platinum, palladium, iridium, rhodium and the like, transition metals such as nickel, and so forth. The electrode surface can advantageously be activated, by deposition of a porous material such as platinum or palladium black, which can be deposited if desired on plates of metals such as stainless steel, iron or the like to form the electrode. Metal oxides such as oxides of iron, magnesium, cobalt, copper and the like may also be used as activating electrode surfaces. The electrode materials may be used in sheet form or in the form of screens, meshes or other types of porous bodies, or as rollers, rings, or like configurations.

As will be apparent from the foregoing discussion, any of a wide variety of fuels, electrolytes and oxidants may be employed in fuel cells embodying a mobile tape separator in accordance with this invention. Descriptions of useful fuel cell reaction components are extensively available in published literature.

The fuel, for example, is sometimes a metal, and in this connection, metals which may be employed as consumable anodes include for example the alkali metals such as lithium, sodium, potassium, Group I A metals such as copper and silver, Group II metals such as magnesium, calcium, strontium, zinc and cadmium, Group III metals such as aluminum, Group IV metals such as tin, and so forth. The metals may be used individually or in mixtures such as the amalgam of sodium with mercury and the like. Gaseous reductants include for example hydrogen, natural and manufactured gas, light hydrocarbons such as propane and butane, inorganic gases such as ammonia, and so forth. Liquid and solid organic and inorganic fuels, including compounds such as methanol, formaldehyde, formic acid, hydrazine, urea, guanidine and the like, generally have the advantage of being relatively cheap and easy to handle, more reactive than hydrocarbons, and soluble in the electrolyte solution, and form an especially preferred class for convenient utilization.

On the oxidant side, air and oxygen are among the most generally studied gaseous anode feed materials. Oxygen carriers such as hydrogen peroxide and various oxides and oxy acids (reducible compounds having one or more oxygen atoms, including peroxides) are also useful. Exemplary of such acids are nitric, sulfuric and persulfuric acids. Illustrative of inorganic oxides which may be employed are gases like $NO_2$ and $SO_2$, and salts such as sodium peroxide, potassium peroxide, vanadium pentoxide, manganese dioxide, and the like. Also included in this group are salts of oxy acids such as sodium, potassium, lithium, barium, magnesium or calcium chromates, perchlorates, permanganates, and the like. Organic oxidants can also be employed as oxygen carriers for the cathode feed and in this connection, advantageous because of the high electron exchange number involved in their reduction are nitro compounds such as nitrobenzene, meta-dinitrobenzene, 2-chloro-5-nitropyridine, 4-nitropyridine - N - oxide, 8-nitroquinoline, p-nitrophenol, tetranitromethane and the like, as well as nitroso compounds such as p-nitrosodiethylaniline, sodium p-nitrosophenolate and the like. Halogens and halogenated compounds can also be used instead of oxygen-carrying compounds, as cathode feed materials. These may be gaseous halogens, such as bromine, fluorine and so forth, or organically bound halogen, as provided by compounds such as N,N'-dibromodimethylhydantoin, N,N'-dichlorodimethylhydantoin, N,N-dichloro - p - toluenesulfonamide, 2-chloronitropropane, and the like.

Electrolytic connection between the anode and cathode of fuel cells operating at relatively low temperatures such as about 100° C. or below is generally provided by an aqueous solutions of an ionizing compound, which may be basic, such as 40% KOH, or acidic, such as 7 molar sulfuric acid, or neutral, such as 1 molar sodium sulfate, 2 molar ammonium or magnesium bromide and the like. Sometimes a solution is both reactant and electrolyte, as is the case for example with aqueous nitric acid used as an oxidant. The electrolyte solvent may be an ionizing liquid other than an aqueous solution, such as liquid ammonia or salt fluxes. Fixed electrolyte, in the form of a hydrated ion exchange membrane, can also be employed, as in the hydrogen/oxygen cell.

While the invention has been described with reference to various particular preferred embodmiments thereof, it is to be understood that variations and modifications can be made without departing from the scope of the present invenion, which is limited only as defined in the following claims.

What is claimed is:

1. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites.

2. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, wherein at least one of said electrochemical reaction components is soluble in the electrolyte.

3. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, wherein said separator is a porous bibulous material.

4. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, wherein said separator carries at least one of the electrochemical reaction components to the active electrode sites.

5. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of eletcrolytically permeable material, and means for moving said separator past said active electrode sites, wherein said separator is a dry carrier of at least one of the electrochemical reaction components to the active electrode sites, and means are provided for causing said separator to be wet with aqueous electrolyte upon passage of said separator past said active electrode sites.

6. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator being a dry carrier of the active anode material.

7. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator being a dry tape coated with a metal consumable anode material.

8. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator being a dry tape of porous bibulous material coated with a metal consumable anode material.

9. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator being a dry carrier of fuel and oxidant to the active electrode sites.

10. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator being a dry tape coated on a first side with a metal consumable anode material, and coated on a second, opposite side with an oxidant.

11. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material and means for moving said separator past said active electrode sites, in which said separator is a dry carrier of at least one of the electrochemical reaction components to the active electrode sites, and means are provided for causing said separator to be wet with aqueous electrolyte by the time it passes said active electrode sites, said separator being a dry tape coated on a first side with a metal consumable anode material, and coated on a second, opposite side with an oxidant, said metal being magnesium.

12. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator carrying the fuel, oxidant and electrolyte to the active electrode sites.

13. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material, and means for moving said separator past said active electrode sites, in which said separator is a dry carrier of at least one of the electrochemical reaction components to the active electrode sites, and means are provided for causing said separator to be wet with aqueous electrolyte upon passage of said separator past said active electrode sites, said separator being a dry porous bibulous base tape coated on a first side with a metal consumable anode material, and on a second side, with a cathode material comprising a cathode depolarizer and electrolyte.

14. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material and means for moving said separator past said active electrode sites, in which said separator carries at least one of the electrochemical reaction components to the active electrode sites, wherein said separator is a dry tape of electrolytically permeable material, coated on at least one side by a liquid electrochemical fuel cell reaction component encapsulated in capsules and releasable to wet said tape by rupture of the capsules, and means are provided for rupturing said capsules as said tape is fed to the fuel cell active electrode sites.

15. A fuel cell comprising anode and cathode current collectors at active electrode sites, fuel cell electrochemical reaction components comprising electrolyte, fuel, oxidant and active anode and cathode materials, active electrode sites from which said collectors convey an electrical current to an external electrical circuit, a mobile separator comprising a body of electrolytically permeable material and means for moving said separator past said active electrode sites, in which said separator carries at least one of the electrochemical reaction components to the active electrode sites, wherein said separator is a dry tape of electrolytically permeable material coated on at least one side by a liquid electrochemical fuel cell reaction component encapsulated in capsules and releasable to wet said tape by rupture of the capsules, and means are provided for rupturing said capsules as said tape is fed to the fuel cell active electrode sites, said encapsulated liquid electrochemical reaction component comprising aqueous electrolyte.

16. A fuel cell comprising anode and cathode current collectors at active electrode sites, a mobile separator comprising a body of electrolytically permeable material, and means for moving said separator past said current collectors to provide an electrolytic connection therebetween, in which said separator is a porous bibulous base tape, coated on one side with a metal consumable anode material and on the other side, with a cathode material comprising a cathode depolarizer and an active electrode material.

17. A fuel cell comprising anode and cathode current collectors at active electrode sites, a mobile separator comprising a body of electrolytically permeable material, and means for moving said separator past said current collectors to provide an electrolytic connection therebetween, in which said separator is a porous bibulous base tape, coated on one side with a metal consumable anode material and on the other side, with a cathode material comprising a cathode depolarizer and an active electrode material, said active electrode material being conductive carbon.

18. A fuel cell comprising anode and cathode current collectors at active electrode sites, a mobile separator comprising a body of electrolytically permeable material, and means for moving said separator past said current collectors to provide an electrolytic connection therebetween, in which said separator is a porous bibulous base tape, coated on one side with a metal consumable anode material and on the other side, with a cathode material comprising a cathode depolarizer and an active electrode material, said metal being magnesium.

19. A fuel cell comprising anode and cathode current collectors at active electrode sites, a mobile separator comprising a body of electrolytically permeable material, and means for moving said separator past said current collectors to provide an electrolytic connection therebetween, in which said separator is a dry porous bibulous base tape, coated on one side with a metal consumable anode material and on the other side, with a cathode material comprising a cathode depolarizer and an active electrode material.

References Cited by the Examiner

UNITED STATES PATENTS

| | | | |
|---|---|---|---|
| 734,547 | 7/1903 | Halsey | 136—141 |
| 2,251,742 | 8/1941 | Kline | 204—2 |
| 2,864,748 | 12/1958 | Mones | 204—2 |
| 2,913,511 | 11/1959 | Grubb | 136—86 |
| 2,925,455 | 2/1960 | Eidensohn et al. | 136—86 |
| 3,016,308 | 1/1962 | Macauley | 117—36.7 |
| 3,017,449 | 1/1962 | Barrett | 136—90 |
| 3,087,003 | 4/1963 | Drengler et al. | 136—10 |
| 3,115,427 | 12/1963 | Rightmire | 136—86 |
| 3,161,546 | 12/1964 | Yeager et al. | 136—86 |

FOREIGN PATENTS 8,497  6/1886  Great Britain.

OTHER REFERENCES

Bauman et al.: U.S. Government Reports, vol. 34, July–December 1960, page 419, Continuous Feed Battery.

WINSTON A. DOUGLAS, *Primary Examiner.*

MURRAY TILLMAN, ALLEN B. CURTIS, *Examiners.*

B. J. OHLENDORF, *Assistant Examiner.*